United States Patent [19]

Gorkov

[11] 4,328,715
[45] May 11, 1982

[54] PLANETARY CRANK GEARING

[76] Inventor: Petr I. Gorkov, prospekt Seifulina, 173-10A, kv. 7, Alma-Ata, U.S.S.R.

[21] Appl. No.: 930,711

[22] Filed: Aug. 3, 1978

[51] Int. Cl.³ ............................................. F16H 37/06
[52] U.S. Cl. ...................................................... 74/674
[58] Field of Search ......................................... 74/674

[56] References Cited

U.S. PATENT DOCUMENTS

| | | | |
|---|---|---|---|
| 2,486,238 | 10/1949 | Aiken | 74/52 |
| 3,089,358 | 5/1963 | Spurgeon | 408/197 |
| 3,788,153 | 1/1974 | Lee | 74/68 |
| 4,122,731 | 10/1978 | Bendure | 74/674 |

*Primary Examiner*—Louis Rimrodt
*Attorney, Agent, or Firm*—Robert E. Burns; Emmanuel J. Lobato; Bruce L. Adams

[57] ABSTRACT

From a common eccentric drive shaft rotation is transmitted to a group of parallel driven shafts spaced from each other.

Set on each one of the driven shafts is a sun gear meshing with its satellite gear having an inner rim. All of the satellites are rigidly interconnected into a single block moving from the eccentric shaft parallel to itself such that each point of said block describes identical circles with an eccentric radius e and the following condition is met for each planetary pair:

$$e = r_2 - r_2 = \text{const},$$

wherein
 $r_1$ is the pitch circle radius of the satellite gear inner rim, and
 $r_2$ is the pitch circle radius of the sun gear.

The gearing of the invention may help simplify the design of multiple spindle multihead machines and drill heads.

6 Claims, 3 Drawing Figures

PLANETARY CRANK GEARING

FIELD OF THE INVENTION

The present invention relates to mechanical gearings and can be used in the various wheel- and caterpillar-type vehicles, in trolleys of cargo cranes, telphers and tackles, in power trucks, in multiple spindle multihead machines and multiple spindle drill heads, and in other mechanisms.

PRIOR ART

There is known in the art a rotary motion transmission between shafts with parallel axles in space, effected by means of an intermediate flexible link (such as belt, band, rope or chain) or a series of gears, usually, with a low gear ratio, since a considerable increase of the gear ratio involves a similar increase in the overall dimensions of the drive or driven link.

For obtaining a high gear ratio, reducing or multiplying gears are provided in the chain, if necessary.

The novel planetary crank gearing makes for transmission of rotary motion from a drive link to shafts with parallel axles in space, both with a considerable reduction and considerable increase of the number of revolutions, without an additional reducing or multiplying gear in the chain.

Moreover, FIGS. 5 and 6 of U.S. Pat. No. 2,486,238 and FIGS. 8 and 9 of U.S. Pat. No. 3,089,358 disclose rigid blocks of planetary gears actuated by eccentric drive shafts; transmission of rotation to a group of shafts by means of planetary pairs.

SUMMARY OF THE INVENTION

It is an object of the present invention to provide a novel planetary crank gearing for simultaneously setting in rotation a group of parallel shafts considerably spaced from each other and having different speeds of rotation.

It can thus be seen that the drawings and disclosure disclose planetary crank gearing for driving parallel shafts. As can be seen from the drawings, and description above, a plurality of planetary gear pairs are shown. Each pair comprises a planet gear driven from a single drive shaft and a sun gear driven by the corresponding planet gear. Thus a single drive shaft will drive a plurality of parallel shafts 1 at different speeds. This is accomplished by having the drive gear 2 drive a gear that meshes with each planet gear of each planetary gear pair. The planet gear of each pair then drives the sun gear. Depending upon the gear ratio between the gears of each pair of gears the speed of the driven output shaft thereof is determined.

It is another object of the present invention to provide a planetary crank gearing that would help simplify the scheme of simultaneously transmitting rotary motion to a group of parallel shafts arbitrarily positioned in space.

It is still another object of the present invention to provide a planetary crank gearing featuring minimum overall dimensions and requiring no costly auxiliary mechanisms, permitting of simultaneous transmission of rotation from a common drive shaft with varying gear ratios to a group of parallel shafts.

It is yet another object of the present invention to provide a planetary crank gearing permitting of simultaneous transmission of rotation with high gear ratios to a group of closely spaced parallel shafts.

It is one more object of the present invention to provide a planetary crank gearing that would permit, in lowspeed vehicles, of a direct transmission of rotary motion from the motor to wheel axles without the use of an additional reducing gear.

It is a further object of the present invention to provide a planetary crank gearing that would permit of obtaining different numbers of revolutions, for example, in multiple spindle drill heads and multiple spindle multihead machines, in each cutter tool, wherein spindles are positioned both symmetrically and asymmetrically with respect to the drive shaft.

In the accomplishment of said and other objects, according to the present invention, disclosure is made of a planetary crank gearing wherein an eccentric drive shaft rotates planetary meshing pairs including a satellite with inner rim and a sun gear; said gearing is characterized in that it comprises a group of driven shafts parallel with the drive shaft, said driven shafts being spaced from each other and each carrying a sun gear rigidly mounted thereon and engaged with the inner rim of its satellite gear, all of the satellites in said group being positioned in a single plane and combined in a single rigid block which is in articulated drive relationship with the common eccentric drive shaft while the points of the articulated joint coupling said eccentric shaft and said satellite block are located in the power load center of the gearing such that the satellite block moves parallel to itself in a single plane and each one of its points describes circles of a single radius equal, for each planetary meshing pair, to the difference between the pitch circle radii of the inner rim of the satellite and of the sun gear.

Such an arrangement of the gearing of the invention provides a relatively simple way of simultaneously transmitting from a single drive shaft rotary motion with different gear ratios to a group of parallel driven shafts spaced from each other and ensures different gear ratios on each driven shaft.

In accordance with the herein described embodiment of the present invention, disclosure is made of a planetary crank gear characterized in that the drive shaft is provided with two rigidly interconnected identical eccentrics shifted 180° relative to each other, said eccentrics serving to set to motion in parallel planes two identical satellite blocks meshing with the same driven sun gears but in diametrically opposite portions thereof.

This is one of the optimum structural embodiments of the disclosed gearing, fully utilizing the advantages offered by the present invention and providing a balanced kinematic system.

BRIEF DESCRIPTION OF DRAWINGS

The present invention will be better understood upon considering the following detailed description of an examplary embodiment thereof to be taken in conjunction with appended drawings in which.

DESCRIPTION OF THE PREFERRED EMBODIMENTS

Figure 1:
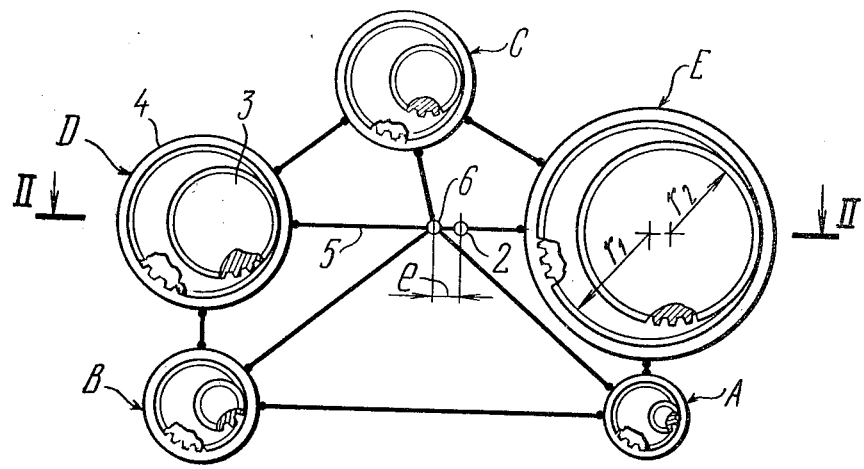
FIG. 1 is a general plan view of the gearing of the invention with a single satellite block in mesh with five sun gears.
Figure 2:
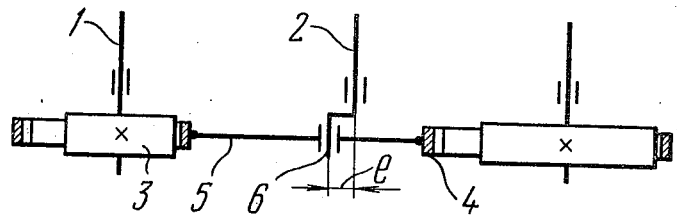
FIG. 2 is a section taken on the line II—II of FIG. 1 with a single satellite block.
Figure 3:
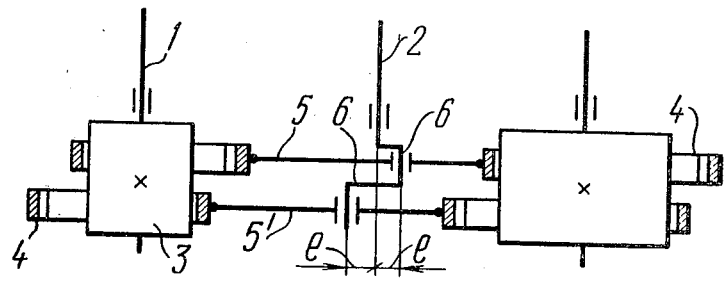
FIG. 3 illustrates the gearing of the invention with two blocks of satellites.

Referring now to FIGS. 1, 2 and 3 of the drawings, rigidly mounted on driven shafts 1 running parallel with an eccentric drive shaft 2 are sun gears 3 in mesh with the inner rims of their satellite gears 4. All of the satellites 4 are interconnected in a single plane by means of an intermediate rigid link to form a single rigid block 5 loose-fitted on one of eccentrics 6 of the eccentric drive shaft 2 located mainly in the power load center of the satellite block. In another plane parallel to the first one, a second block 5' of the satellites 4 is set on a similar eccentric 6' of the drive shaft 2 shifted 180° relative to the first eccentric 6, the inner rims of said satellites 4 meshing with the same driven sun gears 3 but in diametrically opposite portions (FIG. 3).

OPERATING PRINCIPLE OF THE GEARING OF THE INVENTION

Upon rotation of the drive shaft 2, the eccentrics 6 pivot in openings provided in the blocks 5. The blocks 5 with their satellites 4 perform cyclic motions in their planes such that their centers and the centers of the inner rims of the satellites 4 describe circles while the orientation in space of their axes of symmetry remains unchanged. While so doing, the centers of the blocks 5 are being phase-shifted 180° relative to each other. The satellites 4 move with their inner rims about the sun gears 3, the rims of the sun gears 3 meshing with the inner rims of the satellites 4 in diametrically opposite portions, which ensures the symmetry of load on the drive shaft 2 and the driven shafts 1.

The eccentricity of the gearing of the invention is found from the equation $$e = r_1 - r_2 = \text{const},$$

where
- $r_1$ is the pitch circle radius of the inner rim of any one of the satellites 4, and
- $r_2$ is the pitch circle radius of the sun gears 3 in mesh with said satellite 4.

The gear ratio i of the planetary mechanism is found from the relationship $$i = r_2/e, \tag{II}$$

where
- $r_2$ is the pitch circle radius of the sun gear 3, and
- e is the eccentricity of the gearing.

Depending on the ratio of the pitch circle radii of the sun gears 3 to the eccentricity of the gearing, different gear ratios can be obtained in one and the same system on each driven shaft 1 simultaneously with increasing, equal and decreasing numbers of revolutions (FIG. 1) in comparison with number of revolutions of the drive shaft 2, on condition of observing the equality of the eccentricities of all of the planetary mechanisms of one and the same satellite block, i.e., the values of $r_1 - r_2$ should correspond to a single value—eccentricity e of the gearing.

Gear ratios with increasing the number of revolutions in the planetary mechanism will be obtained at $r_2/e < 1$, for example, $i = 10/(30-10) = \frac{1}{2}(A)$.

Gear ratios without changing the number of revolutions will be effected at $r_2/e = 1$, for example, $i = 20/(40-20) = 1(B)$.

Gear ratios with decreasing the number of revolutions will be obtained at $r_2/e < 1$, for example, $i = 40/(60-40) = 2(C)$ or $i = 60/(80-60) = 3(D)$, or, in another case, $i = 100/(120-100) = 5(E)$.

The possibility of obtaining different gear ratios in each driven shaft in a group enables one, for example, obtain different numbers of revolutions for each working spindle in multiple spindle drill heads and multihead machines. In the foregoing example, in the case of $n = 1,000$ rpm on the drive shaft, the first spindle will have $n = 2,000$ rpm, the second spindle—$n = 1,000$ rpm, the third spindle—$n = 500$ rpm, the fourth spindle—$n = 333$ rpm, and the fifth spindle—$n = 200$ rpm. This provides a possibility of simultaneously drilling a plurality of holes spaced at different distances from each other and having different diameters over a wide range (for example, 10 to 100 mm) and of ensuring uniform drilling rates at each drill.

In addition, it is possible to use such multiple spindle drill head for performing different cutting operations such as drilling, counterboring, reaming, with a possibility of attaining optimum cutting conditions in each cutter tool.

The use of multiple spindle drill heads employing the gearing of the invention helps considerably increase the labor efficiency and reduce the consumption of drill heads, as well as obviates the need of providing drilling machines with gear-boxes for purposes of mass production.

In low-speed trolleys of the various machines such as trolleys of tackles, telphers, cranes and other mechanisms, the rotary motion of the electric drive can be transmitted directly to wheel axles without using an additional reducing gear while ensuring the desired reduction of the number of revolutions, which helps simplify the structure of such mechanisms.

The herein-disclosed gearing is further advantageous in that it provides a possibility of obtaining high gear ratios in closely spaced parallel driven shafts, for example, in driven shafts spaced 100 mm from the drive shaft, at a module of $m = 1$, it is possible to obtain gear ratios equal to the distance, i.e., 100.

Since the sun gears are enveloped with the inner rims of the satellites on two opposite sides, a good meshing contact and load symmetry on the drive shaft and all of the driven shafts are ensured in the toothed slots, which provides for a high-torque high-efficiency transmission of rotation at low modules in a toothed gearing.

Planetary satellites with inner rims can be manufactured by the following techniques:
(1) by drawing teeth, mainly, in planetary satellites of small diameters;
(2) by slotting, mainly, in planetary satellites of large diameters but with short connecting rods;
(3) by separately manufacturing the inner rims of satellites in the form of bushings or wheels and positioning them in the holes of connecting rods without the possibility of rotation about their axes.

What is claimed is:

1. Planetary crank gearing for rotation from a single drive shaft to a group of parallel driven shafts spaced from each other comprising, a rotary driven drive shaft, a plurality of parallel driven shafts, for each driven shaft a planetary gear pair, each planetary gear pair comprising a planetary gear driven from said single drive shaft and a sun gear driven by the corresponding planetary gear, a common drive block of planetary gears meshing with each planet gear of each planetary gear pair, the planet gear and sun gear of each planetary gear train being disposed relatively eccentric, and the gear ratios of at least some of the planetary gear pairs being different.

2. Planetary crank gearing for rotation from a single drive shaft according to claim 1, in which the gear ratios of all of the planetary gear pairs are different.

3. Planetary crank gearing for rotation from a single drive shaft according to claim 1, in which said common drive block of planetary gears is eccentric relative to at least some planet gears of the said planetary gear pairs.

4. Planetary crank gearing for rotation from a single drive shaft according to claim 1, in which each planetary gear pair includes a pair of planet gears for each respective sun gear, and each said pair of planet gears being disposed eccentrically relative to the corresponding sun gear, and the eccentricity of a pair of planet gears being 180° apart relative to the corresponding sun gear.

5. A planetary crank gearing for transmitting rotation from a single drive shaft to a group of driven shafts parallel to said drive shaft and spaced from each other, comprising a rotary driven drive shaft, a plurality of parallel driven shafts, for each driven shaft a planetary gear pair, each planetary gear pair comprising a planetary gear driven from said single drive shaft and a sun gear being rigidly set upon and being driven by the corresponding planetary gear, the planetary gears being interconnected in a single block and meshing with the sun gears, the planetary gear and the sun gear of each planetary gear pair train being disposed relatively eccentric, and the gear ratios of at least one of the planetary gear pairs being different.

6. A planetary crank gearing for transmitting rotation from a single drive shaft according to claim 5, in which the single block of planetary gears is disposed eccentric relative to at least some planetary gears of said pairs of planetary gears.

* * * * *